US012775486B2

(12) United States Patent
Dhanuskodi et al.

(10) Patent No.: US 12,775,486 B2
(45) Date of Patent: Oct. 27, 2026

(54) DIRECT USER MODE WORK SUBMISSION IN SECURE COMPUTING ENABLED PROCESSORS

(71) Applicant: NVIDIA CORPORATION, Santa Clara, CA (US)

(72) Inventors: Gobikrishna Dhanuskodi, Santa Clara, CA (US); Philip Browing Johnson, Campbell, CA (US); Muhammad Wasiur Rashid, San Jose, CA (US); Sahil Sapre, Los Gatos, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 741 days.

(21) Appl. No.: 17/525,662

(22) Filed: Nov. 12, 2021

(65) Prior Publication Data

US 2023/0153146 A1 May 18, 2023

(51) Int. Cl.
*G06F 9/48* (2006.01)
*G06F 3/06* (2006.01)
(Continued)

(52) U.S. Cl.
CPC .............. *G06F 9/48* (2013.01); *G06F 3/0623* (2013.01); *G06F 3/065* (2013.01); *G06F 3/0673* (2013.01); *G06F 21/44* (2013.01); *G06F 21/74* (2013.01)

(58) Field of Classification Search
None
See application file for complete search history.

(56) References Cited

U.S. PATENT DOCUMENTS

2006/0272022 A1* 11/2006 Loukianov ......... H04N 21/4405 713/176
2009/0316889 A1* 12/2009 Macdonald ............. G06F 21/10 711/171
(Continued)

FOREIGN PATENT DOCUMENTS

CN 106716434 A 5/2017
CN 110750791 A * 2/2020 ............. G06F 21/57
(Continued)

OTHER PUBLICATIONS

First Office Action received for Chinese Application No. 202210810362.1, dated Jul. 28, 2025, 11 pages.

*Primary Examiner* — Charles E Anya
(74) *Attorney, Agent, or Firm* — Squire Patton Boggs LLP; Sarah Mirza

(57) ABSTRACT

Various embodiments include a system for launching tasks in a computing system operating in a secure mode. The system includes a central processing unit (CPU) that has access to an unsecure memory and does not have access to a secure memory. The system further includes an accelerator (e.g., GPU) that has access to the unsecure memory and the secure memory. The CPU encrypts copy tasks and secure tasks for the accelerator and stores the copy tasks and secure tasks in the unsecure memory. Copy engines in the accelerator read, decrypt, and authenticate the copy tasks and store the decrypted copy tasks in the secure memory. The copy engines execute the decrypted copy tasks to read, decrypt, and authenticate the secure tasks and store the decrypted secure tasks in the secure memory. The accelerator schedules the decrypted secure tasks for execution in the secure mode.

19 Claims, 6 Drawing Sheets

(51) Int. Cl.
*G06F 21/44* (2013.01)
*G06F 21/74* (2013.01)

(56) References Cited

U.S. PATENT DOCUMENTS

| | | | | |
|---|---|---|---|---|
| 2010/0306519 | A1* | 12/2010 | Buonpane | G06F 21/57 380/278 |
| 2014/0068704 | A1* | 3/2014 | Grewal | G06F 21/78 726/4 |
| 2014/0237609 | A1 | 8/2014 | Sharp et al. | |
| 2014/0337569 | A1* | 11/2014 | Ricketts | G06F 12/0802 711/105 |
| 2015/0205607 | A1* | 7/2015 | Lindholm | G06F 9/3888 712/234 |
| 2017/0039381 | A1* | 2/2017 | Sharp | G06F 3/0622 |
| 2017/0060637 | A1* | 3/2017 | Persson | G06F 21/55 |
| 2019/0236022 | A1* | 8/2019 | Gopal | G06F 3/0673 |
| 2022/0138286 | A1* | 5/2022 | Zage | H04L 63/0428 726/26 |

FOREIGN PATENT DOCUMENTS

| | | | | |
|---|---|---|---|---|
| CN | 113614722 | A | 11/2021 | |
| WO | WO-2007033321 | A2 * | 3/2007 | G06F 12/0246 |

* cited by examiner

DIRECT USER MODE WORK SUBMISSION IN SECURE COMPUTING ENABLED PROCESSORS

BACKGROUND

Field of the Various Embodiments

Various embodiments relate generally to parallel processing compute architectures and, more specifically, to direct user mode work submission in secure computing enabled processors.

Description of the Related Art

A computing system generally includes, among other things, one or more processing units, such as central processing units (CPUs) and/or graphics processing units (GPUs), and one or more memory systems. Processing units execute user mode software applications, which submit and launch compute tasks, referred to herein as "work," to "channels" executing on one or more compute engines included in the processing unit. A user mode software application submits and launches work to a compute engine by writing a stream of commands, referred to herein as "methods," to a data structure located in memory. The data structure is referred to herein as a "pushbuffer segment." A pointer to the pushbuffer segment is written to a pushbuffer to initiate processing of the methods in the pushbuffer segment. The user mode software application notifies a scheduler of the pending work. Upon receiving the notification, the scheduler schedules the methods included in the channel for execution on a target compute engine based on a scheduling algorithm. The scheduler reads the pushbuffer data from memory, processes the pushbuffer data, and forwards the corresponding methods to the target compute engine for execution.

Under certain conditions, a computing system may operate in secure mode, where the data associated with a process operating in one context is protected from interference or unauthorized access from other processes operating in other contexts or, in some cases, from the operating system and/or hypervisor. When a processing unit is operating in secure mode, access to certain portions of memory is restricted in order to provide a secure workspace. In one example, when a GPU is operating in secure mode, the scheduler is only allowed to access the pushbuffer segments, the pushbuffer, and the pointers of a particular channel from within a compute protected region of the memory in the GPU. Further, because the path to the protected region in the GPU memory is untrusted, a user mode driver executing on the CPU cannot directly write to the compute protected region to update these data structures in order to submit new work. Instead, only certain secure processors, executing signed secure microcode, and certain direct memory access (DMA) engines, also referred to herein as "copy engines," are capable of moving data into the compute protected region. As a result, the CPU is unable to directly launch new work to the GPU when the GPU is operating in secure mode.

One possible approach to enable the CPU to launch new work to the GPU operating in secure mode is to have the user mode driver write new pushbuffers to unsecured system memory in encrypted form. The user mode driver transmits a request to the secure microcode executing on the secure processor to copy the encrypted data from system memory, decrypt and validate the encrypted data, and write the decrypted data to the compute protected region for processing by the scheduler. The secure processor notifies the scheduler of the new work. As a result, each time new work is submitted by any one or more user mode software applications, the secure processor performs the copy, decryption, authentication, and notification tasks to submit the new work to the scheduler. In general, the secure processor is not designed for such bulk data movement. Further, a typical GPU may have only one or two secure processors, as compared with several dozen compute engines, where each compute engine may support thousands of channels. In such a GPU, one or two secure processors are responsible for processing work for tens of thousands or even hundreds of thousands of channels. As a result, the secure processors become a bottleneck when large numbers of compute tasks are submitted and launched by user mode software applications, leading to reduced performance.

Another possible approach to enable the CPU to launch new work to the GPU operating in secure mode is to have the secure processor program a copy engine channel to move the new work submitted by the user mode driver into the compute protected region. One drawback of this approach is the introduction of an additional level of indirection, such that the user mode driver on the CPU submits new work to the secure processor, the secure processor programs a copy engine to move the new work, and the scheduler forwards the corresponding methods to the target compute engine for execution. This additional indirection adds latency to the processing of new work, leading to additional delay when launching new work. In extreme cases, this work launch latency may be sufficiently high as to render the GPU useless as an accelerator when operating in secure mode.

As the foregoing illustrates, what is needed in the art are more effective techniques for launching new work on a processing unit operating in secure mode.

SUMMARY

Various embodiments of the present disclosure set forth a computer-implemented method for launching secure tasks on a processing unit. The method includes reading an encrypted copy task from an unsecure memory. The method further includes decrypting the encrypted copy task to generate a decrypted copy task. The method further includes executing the decrypted copy task that causes an encrypted secure task to be copied from the unsecure memory to the secure memory. The method further includes decrypting the encrypted secure task to generate a decrypted secure task. The method further includes scheduling the decrypted secure task for execution.

Other embodiments include, without limitation, a system that implements one or more aspects of the disclosed techniques, and one or more computer readable media including instructions for performing one or more aspects of the disclosed techniques, as well as a method for performing one or more aspects of the disclosed techniques.

At least one technical advantage of the disclosed techniques relative to the prior art is that, with the disclosed techniques, the secure processors are not directly involved in launching work, other than initializing the work launch channels. Instead, work launch is performed by copy engines, a more plentiful resource than the secure processors. In general, copy engines are designed to saturate the interface bandwidth while decrypting and authenticating data. Unlike the secure processors, copy engines are specifically designed to perform fast secure data movement. As a result, new work is launched with reduced latency and increased performance relative to prior approaches. An additional advantage of the disclosed techniques is that the copy engines copy encrypted data from unsecure system memory, decrypt the data, authenticate the data, and store the decrypted data in secure memory. Consequently, the copy engines are able to launch new work in secure mode without compromising security. These advantages represent one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

System Overview

Figure 1:
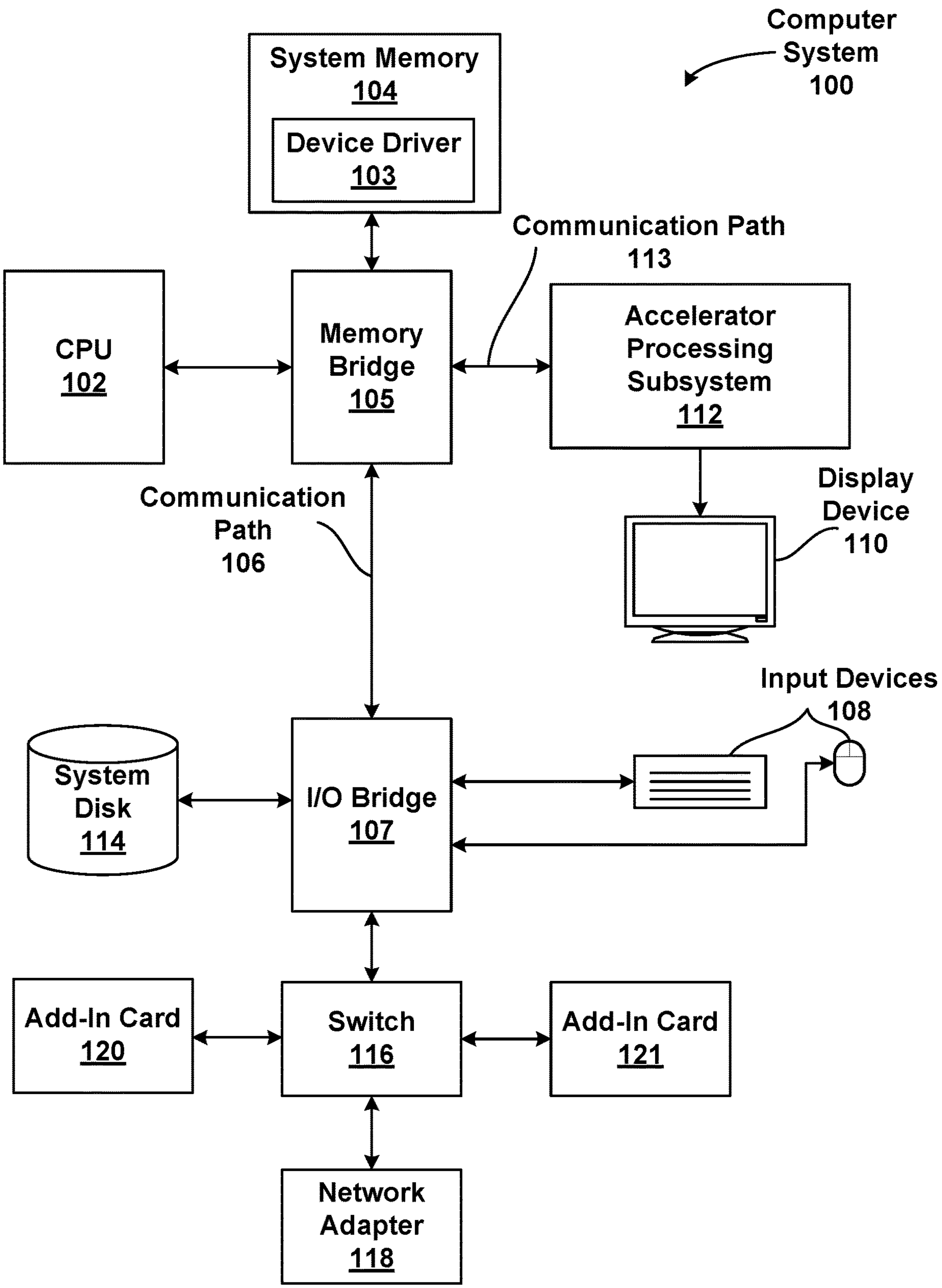
FIG. 1 is a block diagram of a computer system configured to implement one or more aspects of the various embodiments.

FIG. 1 is a block diagram of a computer system 100 configured to implement one or more aspects of the various embodiments. As shown, computer system 100 includes, without limitation, a central processing unit (CPU) 102 and a system memory 104 coupled to an accelerator processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. In some examples, input devices 108 are employed to verify the identities of one or more users in order to permit access of computer system 100 to authorized users and deny access of computer system 100 to unauthorized users. Switch 116 is configured to provide connections between I/O bridge 107 and other components of the computer system 100, such as a network adapter 118 and various add-in cards 120 and 121. In some examples, network adapter 118 serves as the primary or exclusive input device to receive input data for processing via the disclosed techniques.

As also shown, I/O bridge 107 is coupled to a system disk 114 that may be configured to store content and applications and data for use by CPU 102 and accelerator processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, Peripheral Component Interconnect Express (PCIe), HyperTransport, or any other bus or point-to-point communication protocol known in the art.

In some embodiments, accelerator processing subsystem 112 comprises a graphics subsystem that delivers pixels to a display device 110 that may be any conventional cathode ray tube, liquid crystal display, light-emitting diode display, or the like. In such embodiments, the accelerator processing subsystem 112 incorporates circuitry optimized for graphics and video processing, including, for example, video output circuitry. As described in greater detail below in FIG. 2, such circuitry may be incorporated across one or more accelerators included within accelerator processing subsystem 112. An accelerator includes any one or more processing units that can execute instructions such as a central processing unit (CPU), a parallel processing unit (PPU) of FIGS. 2-4, a graphics processing unit (GPU), an intelligence processing unit (IPU), neural processing unit (NAU), tensor processing unit (TPU), neural network processor (NNP), a data processing unit (DPU), a vision processing unit (VPU), an application specific integrated circuit (ASIC), a field-programmable gate array (FPGA), and/or the like.

In some embodiments, accelerator processing subsystem 112 includes two processors, referred to herein as a primary processor (normally a CPU) and a secondary processor. Typically, the primary processor is a CPU and the secondary processor is a GPU. Additionally or alternatively, each of the primary processor and the secondary processor may be any one or more of the types of accelerators disclosed herein, in any technically feasible combination. The secondary processor receives secure commands from the primary processor via a communication path that is not secured. The secondary processor accesses a memory and/or other storage system, such as such as system memory 104, Compute express Link (CXL) memory expanders, memory managed disk storage, on-chip memory, and/or the like. The secondary processor accesses this memory and/or other storage system across an insecure connection. The primary processor and the secondary processor may communicate with one another via a GPU-to-GPU communications channel, such as Nvidia Link (NVLink). Further, the primary processor and the secondary processor may communicate with one another via network adapter 118. In general, the distinction between an insecure communication path and a secure communication path is application dependent. A particular application program generally considers communications within a die or package to be secure. Communications of unencrypted data over a standard communications channel, such as PCIe, are considered to be unsecure.

In some embodiments, the accelerator processing subsystem 112 incorporates circuitry optimized for general purpose and/or compute processing. Again, such circuitry may be incorporated across one or more accelerators included within accelerator processing subsystem 112 that are configured to perform such general purpose and/or compute operations. In yet other embodiments, the one or more accelerators included within accelerator processing subsystem 112 may be configured to perform graphics processing, general purpose processing, and compute processing operations. System memory 104 includes at least one device driver 103 configured to manage the processing operations of the one or more accelerators within accelerator processing subsystem 112.

In various embodiments, accelerator processing subsystem 112 may be integrated with one or more other the other elements of FIG. 1 to form a single system. For example, accelerator processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of accelerator processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, accelerator processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
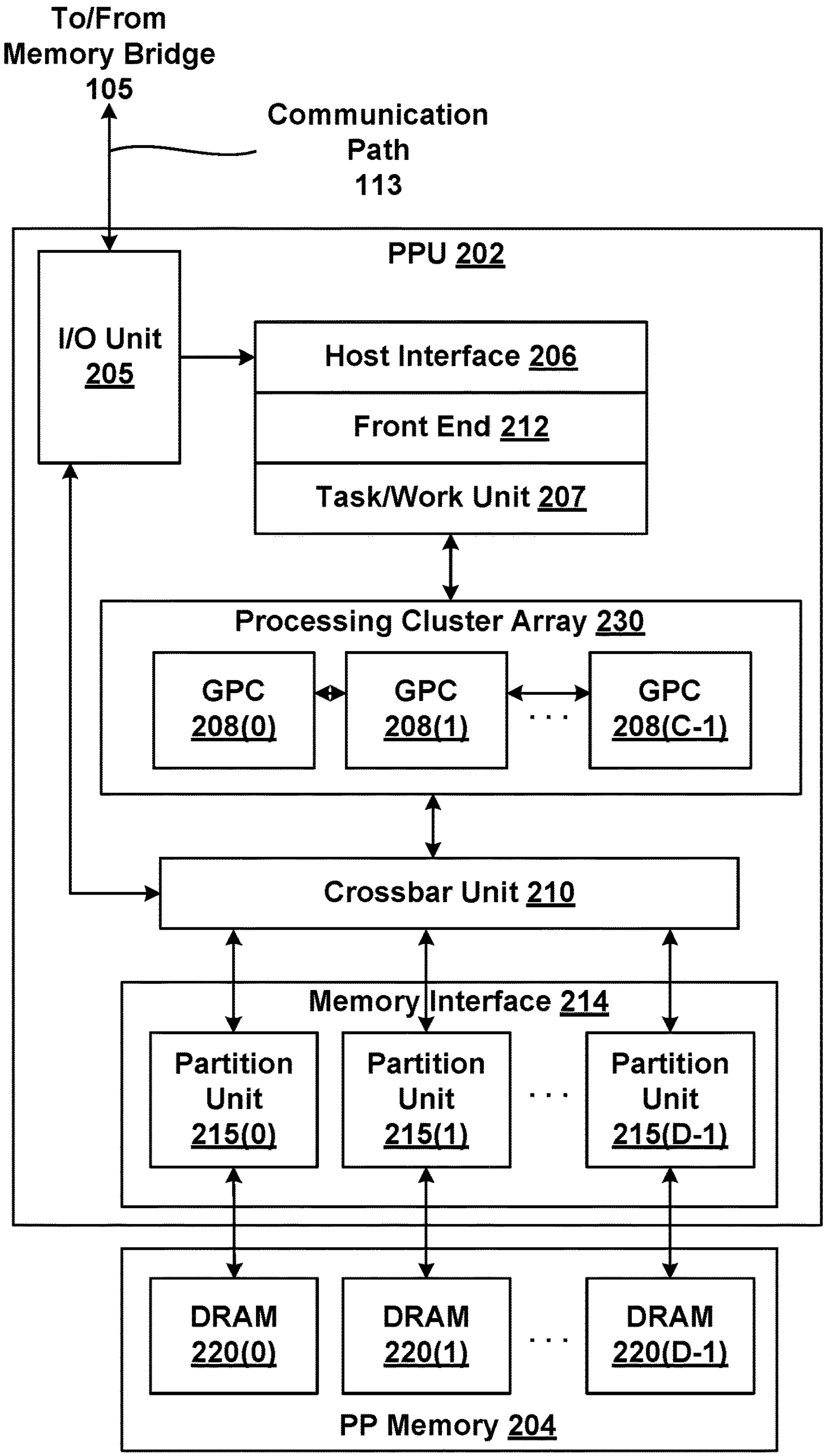
FIG. 2 is a block diagram of a parallel processing unit (PPU) included in the accelerator processing subsystem of FIG. 1, according to various embodiments.

FIG. 2 is a block diagram of a parallel processing unit (PPU) 202 included in the accelerator processing subsystem 112 of FIG. 1, according to various embodiments. Although FIG. 2 depicts one PPU 202, as indicated above, accelerator processing subsystem 112 may include any number of PPUs 202. Further, the PPU 202 of FIG. 2 is one example of an accelerator included in accelerator processing system 112 of FIG. 1. Alternative accelerators include, without limitation, CPUs, GPUs, IPUs, NPUs, TPUs, NNPs, DPUs, VPUs, ASICs, FPGAs, and/or the like. The techniques disclosed in FIGS. 2-4 with respect to PPU 202 apply equally to any type of accelerator(s) included within accelerator processing subsystem 112, in any combination. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. Additionally or alternatively, processors and/or accelerators other than CPU 102 may write one or more streams of commands for PPU 202 to a data structure. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, accelerator processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where D≥1. Each partition unit 215 is coupled to one or more dynamic random access memories (DRAMs) 220 residing within PP memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPC 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity, and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within accelerator processing subsystem 112, or another accelerator processing subsystem 112 within computer system 100.

As noted above, any number of PPUs 202 may be included in an accelerator processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3:
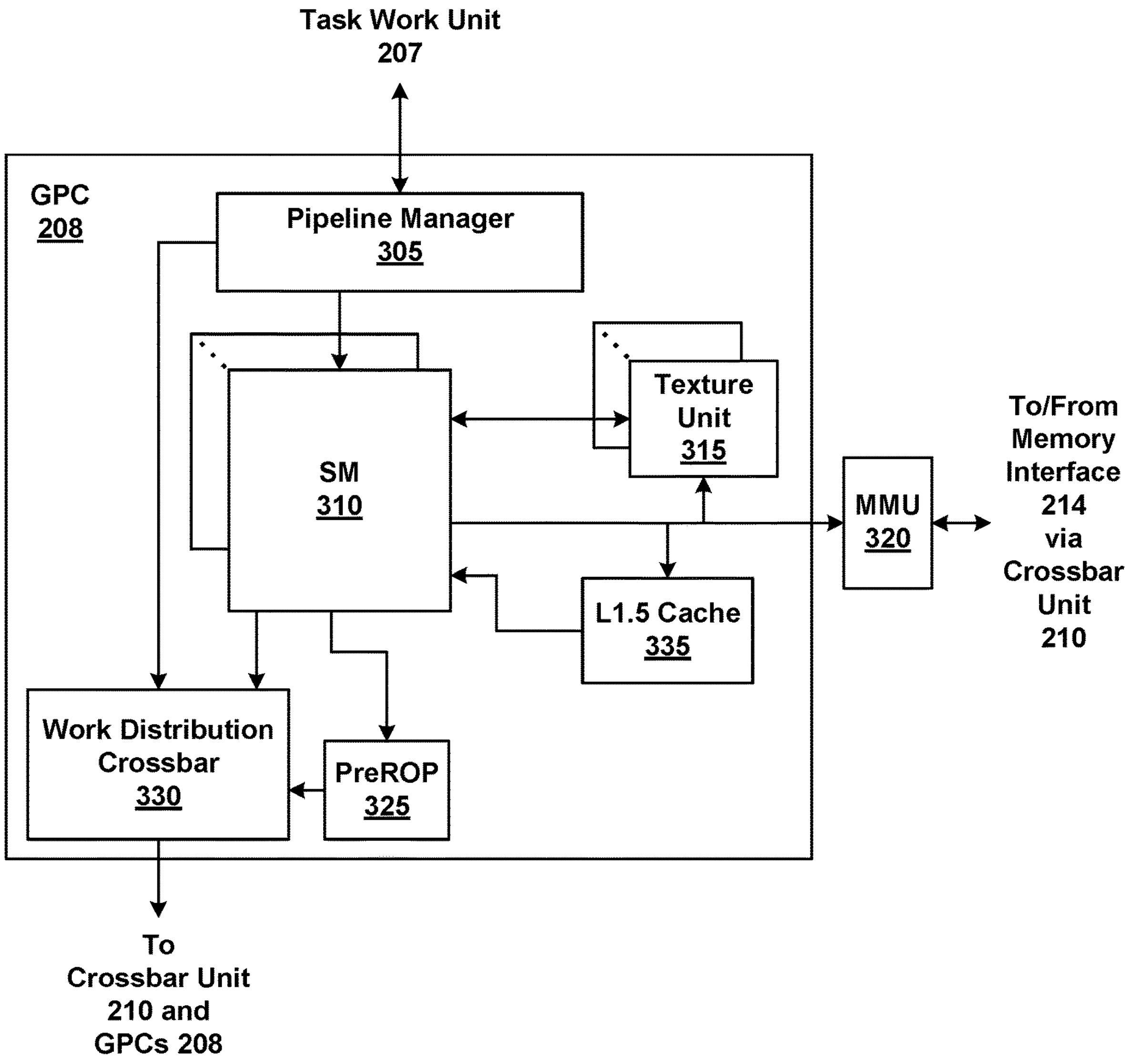
FIG. 3 is a block diagram of a general processing cluster (GPC) included in the parallel processing unit (PPU) of FIG. 2, according to various embodiments.

FIG. 3 is a block diagram of a general processing cluster (GPC) 208 included in the parallel processing unit (PPU) 202 of FIG. 2, according to various embodiments. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMS) 310. Pipeline manager 305 may also be configured to control a work distribution crossbar 330 by specifying destinations for processed data output by SMs 310.

In one embodiment, GPC 208 includes a set of M of SMs 310, where M≥1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (e.g., AND, OR, XOR), bit-shifting, and computation of various algebraic functions (e.g., planar interpolation and trigonometric, exponential, and logarithmic functions, etc.). Advantageously, the same functional execution unit can be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310. In various embodiments, a software application written in the compute unified device architecture (CUDA) programming language describes the behavior and operation of threads executing on GPC 208, including any of the above-described behaviors and operations. A given processing task may be specified in a CUDA program such that the SM 310 may be configured to perform and/or manage general-purpose compute operations.

Although not shown in FIG. 3, each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

Each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In graphics and compute applications, GPC 208 may be configured such that each SM 310 is coupled to a texture unit 315 for performing texture mapping operations, such as determining texture sample positions, reading texture data, and filtering texture data.

In operation, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the core architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3 in no way limits the scope of the various embodiments of the present disclosure.

Please note, as used herein, references to shared memory may include any one or more technically feasible memories, including, without limitation, a local memory shared by one or more SMs 310, or a memory accessible via the memory interface 214, such as a cache memory, parallel processing memory 204, or system memory 104. Please also note, as used herein, references to cache memory may include any one or more technically feasible memories, including, without limitation, an L1 cache, an L1.5 cache, and the L2 caches.

Launching Secure Tasks in Secure Mode

Various embodiments include techniques for launching secure tasks on a processing unit operating in secure mode. These secure tasks execute on compute engines and/or any one or more other engines within the GPU. These secure tasks execute within a trusted execution environment. In the context of GPUs, the secure tasks may include graphics instructions, compute instructions, copy instructions, video encoding and/or decoding instructions, image decompression instructions for the joint photographic experts group (JPEG) format and/or other image formats, optical flow accelerator (OFA) instructions, and/or the like. With the disclosed techniques, a user mode driver executing on a CPU submits new work to the GPU without having to rely on the intervention of secure microcode executing on a secure processor included in the GPU. Instead, with the disclosed techniques, the new work submitted by the user mode driver is copied and decrypted by one or more copy engines, a more plentiful GPU resource than the secure processor.

The copy engines have the capability to read encrypted data from unsecure system memory, decrypt and authenticate the encrypted data, and then write the decrypted data into the compute protected region of memory. Via a two-level pushbuffer structure, a copy engine channel is activated to perform these copy operations for a CPU that lacks the ability to directly submit new instructions to the channel.

Each process executing on the primary processor, such as the CPU, may submit work to the secondary processor, such as a copy engine channel on the GPU. Each process is assigned a separate and dedicated work launch copy engine channel, also referred to herein as a "work launch channel." In some examples, each guest kernel that launches work to the GPU is assigned a different work launch channel. The pushbuffer data structures of the work launch channel reside in the compute protected region of memory. The work launch channel is initialized by secure microcode executing on the secure processor when the user mode driver is initialized. The pushbuffer entries for the work launch channel are predetermined and do not change after initialization by the secure processor. In some embodiments, each user mode driver executing on the CPU is further assigned a launch completion indicator channel. The work launch channel and the launch completion indicator channel are generated by a secure processor executing secure microcode at initialization time. After these two channels are generated, the channels operate without any further intervention from the secure processor unless an error condition is detected. If an error condition is detected, secure microcode executing on the secure processor resolves the error, such as by reinitializing the work launch channel and the launch completion indicator channel.

The work launch channel includes a pair of pushbuffer entries. The first pushbuffer entry points to a predetermined pushbuffer segment that resides in the compute protected region of memory. When executed by the launch copy engine, the methods in this pushbuffer segment perform a decrypted copy of a fixed sized buffer from a specific address in system memory into a predefined target buffer located in the compute protected region of memory. The second pushbuffer entry points to this target buffer in the compute protected region of memory as the source of the next pushbuffer segment. As a result, whatever data is copied into the compute protected region of memory by the copy operation triggered by the first pushbuffer segment becomes the contents of the second pushbuffer segment and subsequently is executed as methods of the channel.

To launch work within the PPU, the user mode driver executing on the CPU generates new pushbuffer segments for different target engine channels. The user mode driver encrypts and stores the new pushbuffer segments in system memory. The user mode driver generates a sequence of copy engine methods to perform the copy operations to move the newly submitted pushbuffer segments to respective target locations in the compute protected region of memory. The user mode driver encrypts and stores the sequence of copy engine methods. The user mode driver stores the encrypted copy engine methods in the predefined system memory location that is the source buffer of the corresponding work launch channel copy instructions stored in the first pushbuffer segment. Further, the user mode driver encodes methods in the buffer to update the put pointer for the work launch channel, thereby identifying the end of the second pushbuffer segment. Once the source buffer is populated, the user mode driver notifies the scheduler of the pending work in the work launch channel.

Upon receiving notification of pending work in the work launch channel, the scheduler marks the work launch channel as PENDING and subsequently schedules the channel. After the channel is loaded, methods from the first pushbuffer segment are executed by the copy engine. These methods cause the copy engine to copy the encrypted source buffer with copy engine instructions into the compute protected region of memory. Because the target location of this copy operation is the pushbuffer segment pointed to by the second pushbuffer entry of the work launch channel, the scheduler fetches the copied data as methods of the work launch channel and forwards the methods to the copy engine for execution. These methods have instructions for the copy engine to copy all newly submitted pushbuffer data structures for other channels executing on different compute engines for the user mode software application. Additionally or alternatively, the pushbuffer data structures for other channels may be executing on any one or more engines within the trusted execution environment. In the case of GPUs, the pushbuffer data instructions may include graphics instructions, compute instructions, additional copy instructions, video encoding and/or decoding instructions, image decompression instructions for the JPEG format and/or other image formats, optical flow accelerator (OFA) instructions, and/or the like. The methods further include instructions for the copy engine and/or scheduler to notify the channels for which new work has been submitted. In addition, the methods include instructions to update the put pointer for the work launch channel. When these instructions are executed, the put pointer for the work launch channel is incremented such that the work launch channel is again ready to repeat the same steps described above upon receiving a subsequent notification. Thus, by repeatedly copying encrypted instructions in the source buffer from system memory to the compute protected region of memory, and then sending a notification to scheduler for the work launch channel, the user mode driver can launch work to any copy engine channel assigned to the user mode driver. Further, other than the initial setup of the work launch channel, the secure processors do not take part in the work launch process.

Figure 4:
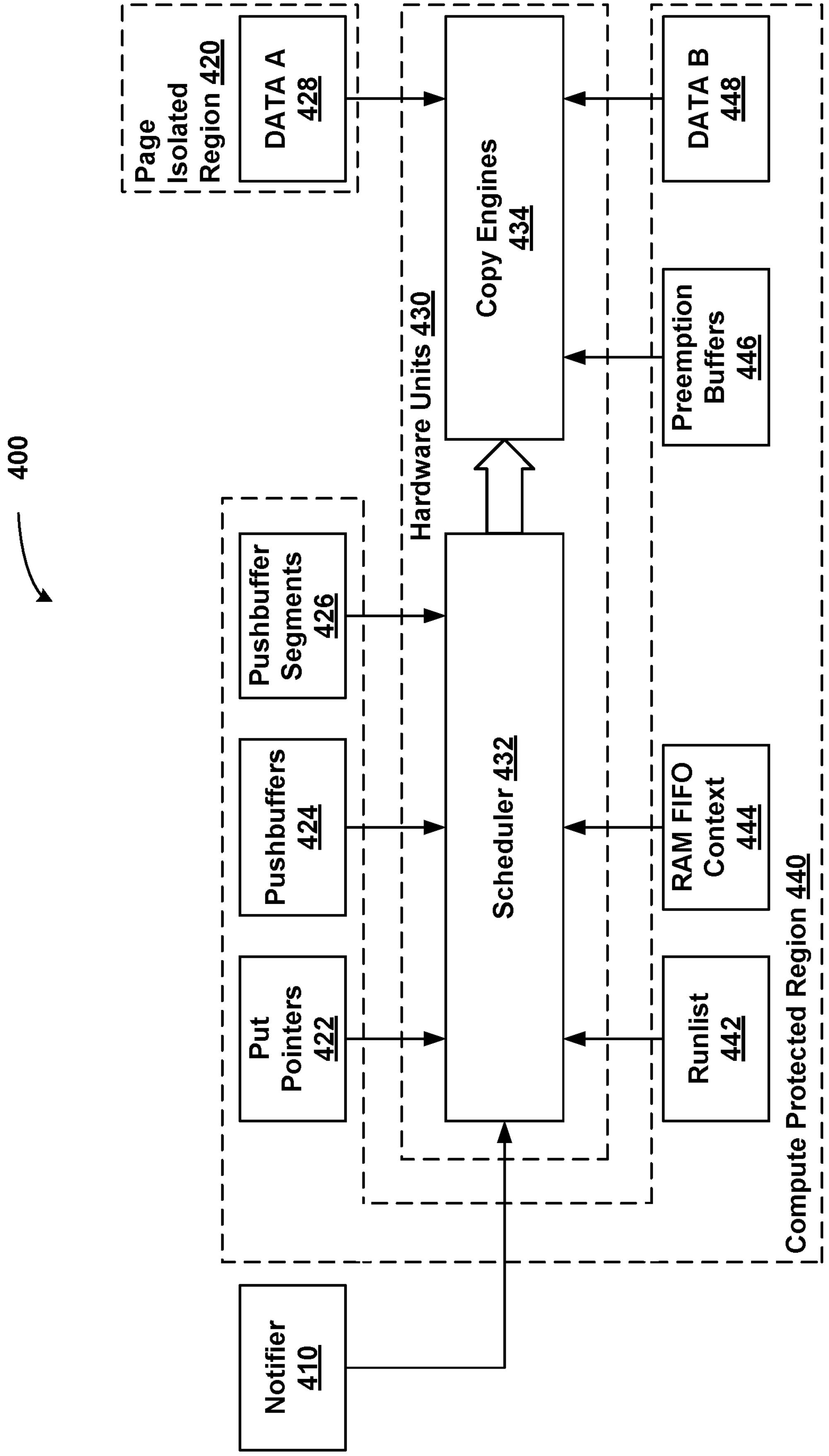
FIG. 4 is a block diagram of the secure task launch system included in the PPU of FIG. 2, according to various embodiments.

FIG. 4 is a block diagram of the secure task launch system 400 included in the PPU 202 of FIG. 2, according to various embodiments. As shown, the secure task launch system 400 includes, without limitation, a notifier 410, a page isolated region 420, hardware units 430, and a compute protected region 440. The page isolated region 420 is page isolated but is otherwise an unsecure non-protected memory region. The page isolated region 420 includes, without limitation, a data A memory block 428. Data A memory block 448 is located in the user mode address space. The hardware units 430 include, without limitation, a scheduler 432, and one or more copy engines 434. The compute protected region 440 includes a set of data structures to support various operations of the secure task launch system 400. The compute protected region 440 includes, without limitation, put pointers 422, pushbuffers 424, pushbuffer segments 426, a runlist 442, RAM FIFO context 444, preemption buffers 446, and a data B memory block 448. Runlist 442, RAM FIFO context 444, and preemption buffers 446 are initialized by a secure engine, and isolated from user mode access. After initialization by the secure processor, runlist 442, RAM FIFO context 444, and preemption buffers 446 are directly accessed by scheduler 432 and by certain engines within the PPU 202. To launch secure tasks, copy engines 434 copy encrypted memory blocks from unsecure memory, such as data A memory block 428, and populate put pointers 422, pushbuffers 424, and pushbuffer segments 426 in the compute protected region 440.

The notifier 410 receives notifications from various user channels, work launch channels, and launch completion indicator channels, as further described herein. The notifier 410 forwards each notification to the scheduler 432 to indicate that the channel issuing the notification has pending work for the scheduler 432 to schedule for execution. In some examples, the notifier 410 includes a memory-mapped register included within the scheduler 432. In such examples, a user process gains access to the notifier 410 when the memory-mapped register included in the notifier 410 is mapped to the memory space of the user process via one or more page tables.

Each put pointer 422 is mapped to a single user channel, work launch channel, or launch completion indicator channel. For a particular channel, the corresponding put pointer 422 indicates the end of valid pushbuffer entries in the corresponding pushbuffer 424. For each channel, the scheduler 432 maintains a get pointer (not shown) that indicates the pushbuffer entry in the corresponding pushbuffer 424 that is currently being processed. After the current pushbuffer entry in the corresponding pushbuffer 424 completes, the scheduler advances the get pointer to point to the next pushbuffer entry. When the get pointer for a particular channel is equal to the put pointer 422 for that channel, the scheduler 432 determines that no additional work remains for that channel. The scheduler 432 stops processing pushbuffer entries for the channel until the put pointer 422, pushbuffer 424, and pushbuffer segments 426 for the channel are updated, and the notifier 410 transmits a notification for the channel to the scheduler 432.

Each pushbuffer 424 maintains a sequence of pushbuffer entries for a particular channel, where each pushbuffer entry points to a corresponding pushbuffer segment 426. The pushbuffer segment 426 includes methods, where each method includes instructions to perform a particular operation. When the methods included in a pushbuffer segment complete execution, the get pointer advances to the next pushbuffer entry in the pushbuffer. If the get pointer is equal to the put pointer, then the work on the pushbuffer is complete. Otherwise, the get pointer points to the next pushbuffer entry that, in turn, points to the next pushbuffer segment for the channel.

The runlist 442 is an ordered list of channels that the scheduler 432 reads to determine which channels to consider for execution. At any given time, the runlist 442 holds a subset of all channels that may execute on an engine. In general, the runlist 442 is read, but not written, by the scheduler 432. The runlist 442 is generated by a secure engine when executing in secure mode, thereby authenticating the runlist 442.

The RAM FIFO context 444 is a per-channel memory structure that is employed by the scheduler 432 and engines to save and restore channel state to support channel switching. The RAM FIFO context 444 includes, among other things, the page directory base (PDB), method execution pointers, and the host state. The page directory base is the address of the page table structure used for translating the virtual address memory requests for the channel to physical addresses. In contrast to the runlist 442, the scheduler 432 does write to the RAM FIFO context 444. However, the pointer to the RAM FIFO context 444 is included in the runlist 442, thereby locking the location of the RAM FIFO context 444. The RAM FIFO context 444 is a fixed data structure that the hardware reads and writes. Although the methods included in pushbuffer segments 426 can modify values in the RAM FIFO context 444, the trust boundary with the RAM FIFO context 444 is the same as the standard context used for isolation from user mode to kernel state. The RAM FIFO context 444 is generated by a secure engine when executing in secure mode, thereby authenticating the RAM FIFO context 444.

The preemption buffers 446 are per context buffers in memory where engines save out unexecuted methods queued in the engine and other relevant states when a channel is preempted. If a channel is switched out of an engine before all of the work queued up in the engine completes, the channel is preempted. In such cases, the engine saves unexecuted methods and other relevant state for the channel to the corresponding preemption buffer 446 for the engine. When the channel is rescheduled on the engine again, the engine first fetches and executes the saved methods before executing new methods from the method stream. Similar to the RAM FIFO context 444, the preemption buffers 446 have a fixed hardware write/read structure. In general, the preemption buffers 446 are only written and read by engines. Further, the preemption buffers 446 are located in the compute protected region of PP memory 204, thereby minimizing the risk of intentional or unintentional tampering or corruption.

The copy engines 434 perform the copy operations for launching work via the work launch channels and the launch completion indicator channels. The copy engines 434 execute methods to launch new work associated with launch work channels and launch completion indicator channels. The copy engines 434 read encrypted data from unsecure system memory 104. The copy engines have the capability to read encrypted data from unsecure system memory, decrypt and authenticate the encrypted data, and then write the decrypted data into the compute protected region of PP memory 204. In general, any copy engine 434 can launch work for a channel executing on any engine. Further, any copy engine 434 can execute a work launch channel, where the work launch channel can launch work for another channel executing on the same copy engine 434.

Further, the copy engines 434 perform the copy operations for executing work via user channels. The copy engines 434 execute the pushbuffer segments methods decrypted, authenticated, and stored by the copy engines 434.

The data A memory block 428 is representative of storage area in the unsecure page isolated region 420. Correspondingly, the data B memory block 448 is representative of storage area in the secure compute protected region 440. When data is transferred between the data A memory block 428 and the data B memory block 448, the secure task launch system 400 performs certain tasks to maintain the security of the data. In particular, when a copy engine 434 performs copy operations associated with a work launch channel, the copy engine 434 reads the encrypted data from unsecure page isolated region 420. The user mode driver executing on the CPU 102 generates the encrypted data and generates an authentication tag that is verified by the copy engine 434. The copy engine 434 decrypts the encrypted data and authenticates the data by verifying the authentication tag. The copy engine 434 authenticates the data as the copy engine 434 proceeds towards the end of the copy operation, after the data block is committed to memory. As a result, the copy engine 434 is able to authenticate and copy arbitrary sized data blocks. The methods in the data blocks are authenticated prior to execution. As a result, the methods are determined to be trusted prior to execution. If authentication of the data block is successful, then the data block is written in decrypted form to the compute protected region 440 in PP memory 204.

The copy engine 434 copies the data block to the compute protected region 440 in PP memory 204. However, if the authentication of the copied data block fails, then the copy engine 434 prevents the second subsequently copied data block from executing. More specifically, the copy engine 434 does not prevent data from being written to the compute protected region 440. Instead, the copy engine 434 performs a first copy operation of the data block to compute protected region 440. During the first copy operation, the compute engine 434 reads and decrypts the user supplied methods. The copy engine 434 performs an authentication process upon completion of first copy operation of the data block. At this point, the write operations associated with the first copy operation have been forwarded to the compute protected region 440 by the copy engine 434. If the authentication process passes, then the copy engine 434 initiates the second copy operation of the data block. The second copy operation moves the user data and launches the user work included in the data block. If, however, the authentication process fails, then the copy engine 434 does not initiate the second copy operation of the data block. As a result, the failure of authentication process of the first copy operation does not result in corruption of the user data and the user methods therein.

This authentication technique prevents source address and size attacks. In addition, the copy engine 434 authenticates the target address for the methods in the data block and the associated page tables, which are stored in the compute protected region 440 in PP memory 204. This authentication technique prevents target address attacks. In some embodiments, the copy engine 434 may check the authentication tag incrementally as the copy engine 434 decrypts and copies the encrypted data. In such embodiments, the copy engine 434 may not be able to determine whether the authentication tag matches until the decryption and copy operation completes. Therefore, the copy engine 434 does not prevent the copy of the data to the compute protected region 440 of PP memory 204. Instead, if the authentication the copy engine 434 failed to verify the authentication tag, the copy engine 434 does not indicate the completion of the copy operation to the user mode driver executing on the CPU 102.

It will be appreciated that the system shown herein is illustrative and that variations and modifications are possible. As described herein, a user mode driver executing on the CPU 102 generates new work for the PPU 202 and submits the new work via a work launch channel. However, the new work for the PPU 202 may be generated by any one or more technically feasible processing units. Likewise, the new work generated by the CPU 102 may be executed by any one or more technically feasible processing units.

Figure 5:
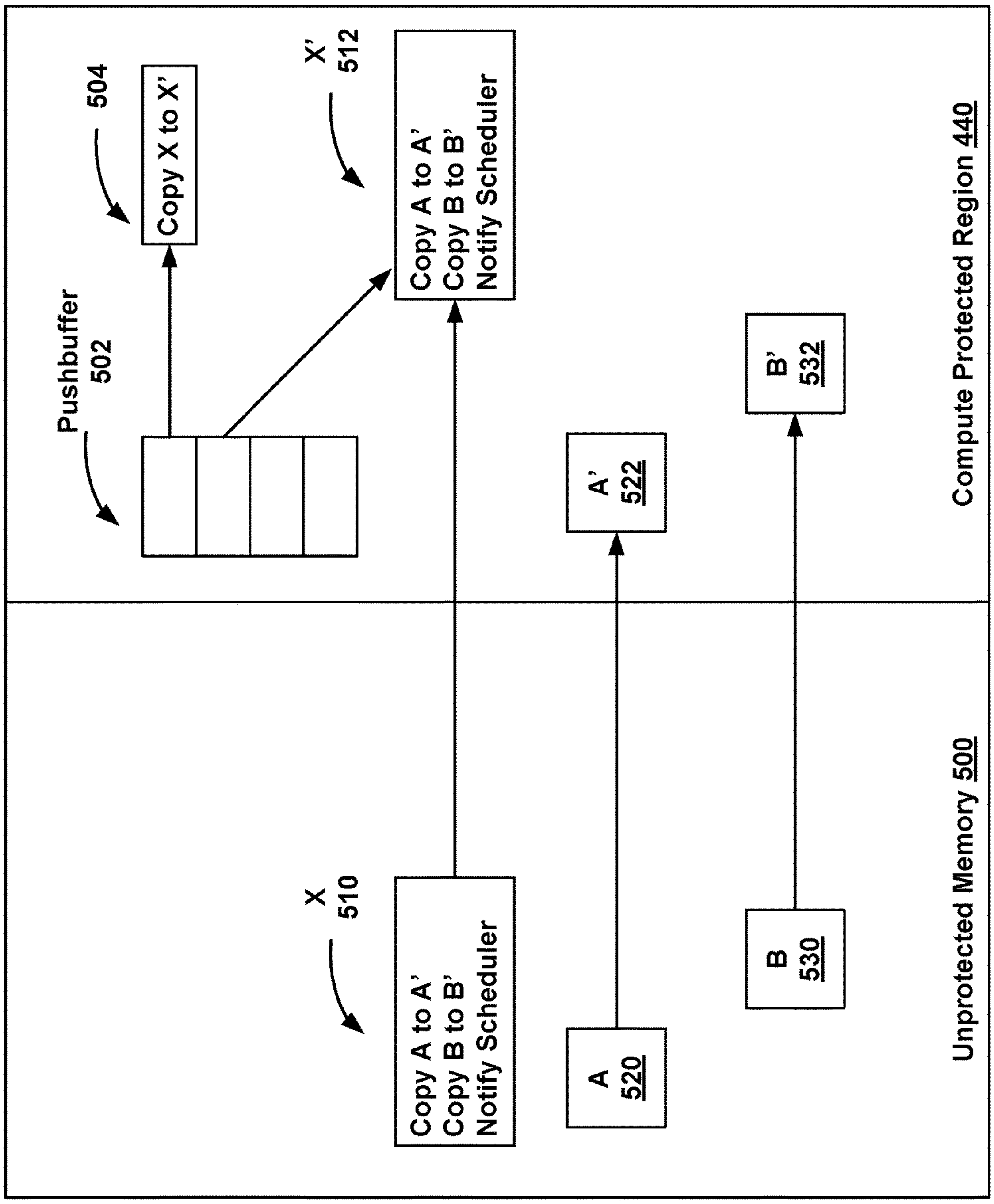
FIG. 5 is a block diagram of data structures stored in the unprotected memory and the compute protected region of the PP memory of FIGS. 1-2, according to various embodiments.

FIG. 5 is a block diagram of data structures stored in the unprotected memory 500 and the compute protected region 440 of the PP memory 204 of FIGS. 1-2, according to various embodiments. The unprotected memory 500 may be included in system memory 104, in PP memory 204, and/or in another memory system within the GPU. The compute protected region 440 is included in the PP memory 204. In some examples, PP memory 204 may be subdivided into two regions, a first region that includes unprotected memory 500 and a second region that includes compute protected region 440. As shown, the unprotected memory 500 includes, without limitation, an X buffer 510, an A buffer 520, and a B buffer 530. The compute protected region 440 includes, without limitation, a pushbuffer 502, a first pushbuffer segment 504, and a second pushbuffer segment, also referred to herein as an X' buffer 512. The compute protected region 440 further includes, without limitation, an A' buffer 522, and a B' buffer 532.

The process of launching new work in secure mode involves two channels executing on a copy engine capable of performing encryption and decryption. These two channels include the work launch channel and the launch completion indicator channel. These two channels are generated by a secure processor executing secure microcode at initialization time. After these two channels are generated, the channels operate without any further intervention from the secure processor unless an error condition is detected. If an error condition is detected, secure microcode executing on the secure processor resolves the error, such as by reinitializing the work launch channel and the launch completion indicator channel.

When a user mode software application executes on the CPU 102, the user mode software application periodically submits new work to the PPU 202. In so doing, the user mode software application generates pushbuffer segments that include methods to be executed by compute engines in the PPU 202. A user mode driver associated with the user mode software application and executing on the CPU 102 encrypts the pushbuffer segments and stores the encrypted pushbuffer segments in unsecure unprotected memory 500. As shown, the encrypted pushbuffer segments include the A buffer 520 and the B buffer 530. In addition, the user mode driver generates, encodes, and stores a pushbuffer segment at a defined location in unprotected memory 500. This encrypted pushbuffer segment includes methods to copy the A buffer 520 and the B buffer 530 to the compute protected region 440 of PP memory 204 and then notify the scheduler. As shown, this encrypted pushbuffer segment includes the X buffer 510. The user mode driver notifies the scheduler 432 of pending work in the work launch channel.

In response, the PPU 202 accesses the first entry in the pushbuffers 502. This first entry, initialized by the secure processor, references the first pushbuffer segment 504, which is also initialized by the secure processor. The first pushbuffer segment 504 includes a method to copy the X buffer 510, located at a defined location in unprotected memory 500, to the X' buffer 512, located at a defined location in the compute protected region 440. The copy engine 434 executes the method included in the first pushbuffer segment 504 to read, decrypt, and authenticate the methods included in the X buffer 510 and store the decrypted methods to the X' buffer 512.

The PPU 202 accesses the second entry in the pushbuffers 502. This second entry references the X' buffer 512. The copy engine 434 executes the methods included in the X' buffer 512. When executing the first method, the copy engine 434 reads, decrypts, and authenticates the methods included in the A buffer 520 and stores the decrypted methods to the A' buffer 522. Similarly, when executing the second method, the copy engine 434 reads, decrypts, and authenticates the methods included in the B buffer 530 and stores the decrypted methods to the B' buffer 532. When executing the third method, the copy engine 434 notifies the scheduler 432 of the pending work included in the A' buffer 522 and the B' buffer 532. The scheduler 432 forwards the work included in the A' buffer 522 and the B' buffer 532 to the target compute engines for execution. Further details of the work launch channel and the launch completion indicator channel are now described.

A user mode driver executing on the CPU 102 generates a series of direct memory access (DMA) operations executable by a copy engine to copy and decrypt user pushbuffer structures from unsecure unprotected memory 500 to the compute protected region 440 of PP memory 204. The user pushbuffer structures include pushbuffer entries, pushbuffer segments, and put pointers for various user mode channels.

The methods for the DMA operations generated by the user mode driver are stored in a set of staging buffers, such as the X buffer 510, in unprotected memory 500 in encrypted form. System memory may include any technically feasible number of such staging buffers, also referred to herein as "memory buffers." Each staging buffer is at a different predefined fixed location in system memory. Further, the size of each staging buffer is predefined and fixed. In some embodiments, the DMA operations for copying a set of user pushbuffer structures cannot fit in a single staging buffer, such as when a user process submits hundreds of separate pushbuffer segments. In such embodiments, the DMA operations may be divided and stored in multiple staging buffers. Additionally or alternatively, the DMA operations may be executed in multiple steps or phases.

The work launch channel reads the encrypted pushbuffer data structures for user mode channels from unsecure unprotected memory 500. The work launch channel decrypts and stores these pushbuffer data structures in the compute protected region 440 of PP memory 204. Subsequently, the scheduler 432 fetches these pushbuffer data structures of the work launch channel from the compute protected region and forwards the pushbuffer data structures to the target compute engines for execution.

In one particular example, the work launch channel pushbuffer 424 may have 8 entries. After the secure processor initializes the work launch channel, the put pointer 422 is set to 2, while the get pointer is set to 0. The difference between the put pointer 422 and the get pointer is 2, indicating that the work launch channel pushbuffer 424 includes two active pushbuffer entries. Upon receiving a notification of new work, the scheduler 432 reads and executes first two pushbuffer entries, such as entry 0 and entry 1, in the work launch channel.

The even numbered work launch channel pushbuffer entries (numbered 0, 2, 4, 6) point to respective pushbuffer segments that have methods to execute a DMA operation to copy a staging buffer, such as the X buffer 510 from a predefined location in unprotected memory 500 to a predefined location in the compute protected region 440. These pushbuffer segments are referred to herein as "launch execution pushbuffer segments." The launch execution pushbuffer segments pointed to by pushbuffer entries 0, 2, 4, and 6 copy staging buffers 0, 1, 2, and 3, respectively. Each staging buffer has a predefined fixed size. As a result, a particular staging buffer may be only partially filled with valid methods, with the remainder of the staging buffer having invalid data. In any case, the user mode driver executing on the CPU 102 encrypts the entire staging buffer. Likewise, the copy engine reads the entire staging buffer from unprotected memory 500, decrypts and stores the staging buffer, and then stores the entire staging buffer to the compute protected region 440 of PP memory 204. Therefore, the last valid method in the staging buffer is followed by an "end pushbuffer segment control" method to indicate the end of the pushbuffer segment.

The launch execution pushbuffer segment releases a non-wait-for-idle scheduler semaphore release that updates the put pointer 422 of the launch completion indicator channel. The put pointer 422 is set to ((1+j) & 0x3), where j=the number of the pushbuffer entry/2). The launch execution pushbuffer segment releases a non-wait-for-idle scheduler semaphore release that notifies the launch completion indicator channel of pending work. The launch execution pushbuffer segment releases a wait-for-idle DMA semaphore release that causes the scheduler to wait for the copy engine to complete the copy operation of the staging buffer before proceeding. As part of the copy operation, the copy engine authenticates the copy of the methods in the staging buffer. If the authentication of the copy fails at this point, then the work launch channel stops execution. Because only the state of the work launch channel is corrupted, then the system may determine that only the work launch channel needs to be reset, because no user channel is corrupted.

The odd numbered work launch channel pushbuffer entries (numbered 1, 3, 5, 7) point to respective pushbuffer segments corresponding to the number of the pushbuffer entry. These odd numbered work launch channel pushbuffer entries include a synchronization wait indicator. The wait indicator prevents the odd numbered pushbuffer segment from executing until the corresponding even numbered pushbuffer segment has completed the copy operation of the staging buffer, as indicated by the completion of the wait-for-idle DMA semaphore. At that point, the relevant odd numbered pushbuffer segment includes a decrypted version of the copy engine methods generated by the user mode driver and stored in the encrypted staging buffer. These copy engine methods include instructions for copying the encrypted user pushbuffer segments from unprotected memory 500 to the compute protected region 440 of PP memory 204 in decrypted form. When the scheduler 432 issues the fetch for the decrypted pushbuffer segment, the scheduler retrieves a decrypted version of the methods generated by the user mode driver. These methods generate copy operations to copy the encrypted user pushbuffers, pushbuffer segments, and put pointers from unprotected memory 500 to the compute protected region 440 of PP memory 204 in decrypted form. These methods then notify the scheduler 432 of pending work for the relevant user channels. In some embodiments, a single work launch channel may launch new work for multiple user channels.

In some embodiments, the launch execution pushbuffer segment does not include host-level semaphore acquire methods, so as to avoid scheduling the launch completion indicator channel too early. In such embodiments, if semaphore acquire methods are desired in the work launch channel, then the launch completion indicator channel put pointer 422 update and the notification methods may be moved from the first (even numbered) launch execution pushbuffer segment and placed in the second (odd numbered) launch execution pushbuffer segment after the semaphore acquire operation.

The launch completion indicator channel includes a pushbuffer 424 separate from the pushbuffer 424 for the work launch channel. The launch completion indicator channel pushbuffer 424 may include a different number of entries than the work launch channel pushbuffer 424. In one particular example, the work launch channel pushbuffer 424 may include 8 entries and the launch completion indicator channel pushbuffer 424 may include 4 entries. After initialization, the put pointer 422 and the get pointer for the launch completion indicator channel pushbuffer 424 are both set to 0.

Each launch completion indicator channel pushbuffer entry points to a separate corresponding pushbuffer segment. Each of the pushbuffer segments 'j' perform similar operations. The pushbuffer segments 'j' include a constant copy and flush method that updates the work launch channel put pointer 422 to ((4+j*2) & 0x7). This method flushes data from the prior pushbuffer segment and prepares the work launch channel for the next work launch operation. The pushbuffer segments 'j' further include a copy operation to write an encrypted version of the pushbuffer segments 'j' to a predetermined and fixed location in unprotected memory 500. This encrypted version is encrypted and has an authentication tag. Therefore, the encrypted version is referred to as an authenticated encryption of the pushbuffer segments 'j.' This operation indicates to the user mode driver executing on the CPU 102 that the PPU 202 has consumed the staging buffer corresponding to pushbuffer segments 'j.'

To summarize, the user mode driver executing on the CPU 102 employs the staging buffers sequentially to submit new work to the PPU 202. To launch new work, the user mode driver updates the next sequential staging buffer with the relevant methods. The user mode driver may update the next sequential staging buffer while the PPU 202 is processing a current staging buffer. The user mode driver polls the value at the predetermined and fixed location in unprotected memory 500 until the value indicates that the PPU 202 has consumed the current staging buffer. When the user mode driver determines that the PPU 202 has consumed the current staging buffer, the user mode driver notifies the scheduler 432 that the next staging buffer is ready for processing.

If the user mode driver notifies the scheduler 432 prematurely or has not updated the next staging buffer properly, then the launch execution pushbuffer segment that copies the staging buffer indicates that the authentication check failed. This condition results in the corruption of the work launch channel, but not corruption any of the user channels or of user data stored in the compute protected region 440 of PP memory 204. As a result, the secure processor is able to recover from the error by resetting the work launch channel without resetting any of the user process channels.

Figure 6:
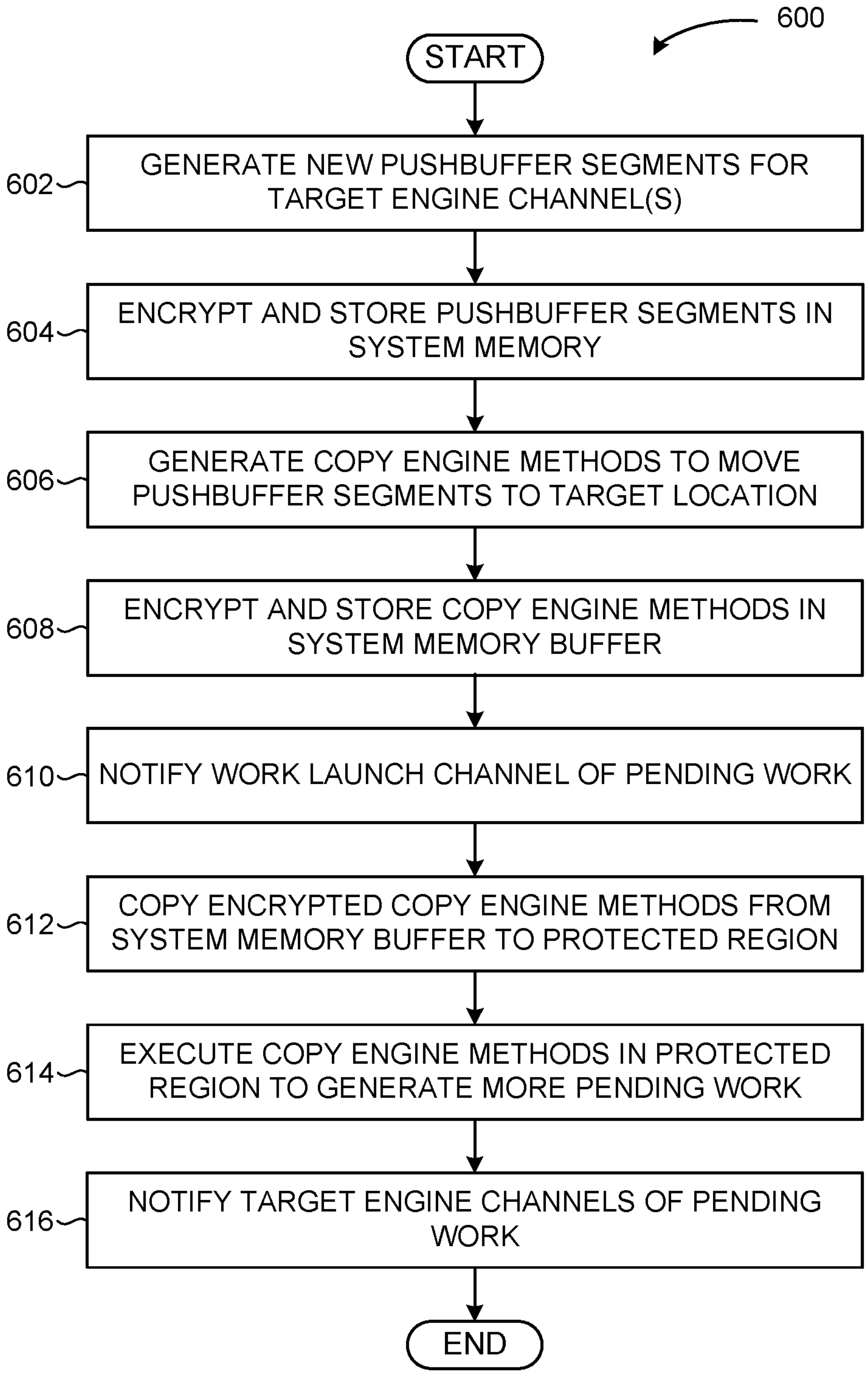
FIG. 6 is a flow diagram of method steps for launching secure tasks on an accelerator operating in secure mode, such as the PPU of FIG. 2, according to various embodiments, according to various embodiments.

FIG. 6 is a flow diagram of method steps for launching secure tasks on an accelerator operating in secure mode, such as the PPU 202 of FIG. 2, according to various embodiments. Additionally or alternatively, the method steps may be performed by one or more alternative accelerators including, without limitation, CPUs, GPUs, IPUS, NPUs, TPUs, NNPs, DPUs, VPUs, ASICs, FPGAs, and/or the like, in any combination. Although the method steps are described in conjunction with the systems of FIGS. 1-5, persons of ordinary skill in the art will understand that any system configured to perform the method steps, in any order, is within the scope of the present disclosure.

As shown, a method 600 begins at step 602, where a user mode driver executing on a CPU 102 generates new pushbuffer segments for target engine channel(s) on a PPU 202. The new pushbuffer segments represents work submitted by the user mode driver to be executed by the PPU 202. The pushbuffer segments includes one or more streams of commands formatted in a data structure located in unprotected memory 500 and accessible to both the CPU 102 and the PPU 202.

At step 604, the user mode driver encrypts and stores the new pushbuffer segments in unprotected memory 500. Because the pushbuffer segments are encrypted, other processes executing in the CPU 102 and/or the PPU 202 are not able to decipher the methods included in the pushbuffer segments. In some examples, the encrypted pushbuffer segments are signed in order to support authentication of the pushbuffer segments, thereby reducing or eliminating corruption of the methods included in the pushbuffer segments.

At step 606, the user mode driver generates a sequence of copy engine methods to perform the copy operations to move the newly submitted pushbuffer segments to respective target locations in the compute protected region 440 of PP memory 204. At step 608, the user mode driver encrypts and stores the sequence of copy engine methods in unprotected memory 500. The user mode driver stores the encrypted copy engine methods in a predefined system memory location that is the source buffer of the corresponding work launch channel copy instructions stored in a first pushbuffer segment in the work launch channel. In addition, the user mode driver encodes methods in the buffer to update the put pointer for the work launch channel, thereby identifying the end of the second pushbuffer segment. Because the methods are encrypted, other processes executing in the CPU 102 and/or the PPU 202 are not able to decipher the methods.

At step 610, the user mode driver transmits a notification to a notifier 410. The notifier 410, in turn, notifies the work launch channel of the pending work generated in steps 602 and 606 and encrypted and stored in steps 604 and 608, respectively.

At step 612, a copy engine 434 copies the encrypted copy engine methods from a buffer in unprotected memory 500 to the compute protected region 440 in PP memory 204. More specifically, the copy engine 434 accesses a first entry in a pushbuffer 502. This first entry, initialized by the secure processor, references the first pushbuffer segment 504, which is also initialized by the secure processor. The first pushbuffer segment 504 includes a method to copy the encrypted copy engine methods, stored in step 608, located at a defined location in unprotected memory 500, to a corresponding defined location in the compute protected region 440. The copy engine 434 executes the method included in the first pushbuffer segment 504 to read, decrypt, and authenticate the methods and store the decrypted methods in the compute protected region 440.

At step 614, the copy engine 434 executes the decrypted copy engine methods stored in the compute protected region 440 in PP memory 204 to generate more pending work for one or more user channels. More specifically, the copy engine 434 accesses a second entry in the pushbuffer 502. This second entry references the decrypted methods stored in the compute protected region 440. The copy engine 434 executes the decrypted methods. When executing the methods, the copy engine 434 may read, decrypt, and authenticate the methods included in one or more encrypted buffers in unprotected memory 500 and store the decrypted methods to corresponding buffers in the compute protected region 440 in PP memory 204. The copy engine 434 further executes a method that notifies the scheduler 432 of the pending methods included in the decrypted buffers.

At step 616, the scheduler 432 notifies the relevant target engine channels of the pending work included in the decrypted buffers. The scheduler 432 forwards the methods included in the decrypted buffers to the target compute engines for execution. One or more compute engines, such as copy engines 434, then execute the methods included in the decrypted buffers.

The method 600 then terminates. Alternatively, the method 600 proceeds to step 602 to launch additional secure tasks. Thus, by repeatedly copying encrypted instructions in source buffers from unprotected memory 500 to the compute protected region 440 of PP memory 204, and then sending a notification to scheduler 432 for the work launch channel, the user mode driver can launch work to any copy engine channel assigned to the user mode driver.

In sum, various embodiments include techniques for launching secure tasks on a processing unit operating in secure mode. These secure tasks execute on compute engines and/or any one or more other engines within the GPU. These secure tasks execute within a trusted execution environment. In the context of GPUs, the secure tasks may include graphics instructions, compute instructions, copy instructions, video encoding and/or decoding instructions, image decompression instructions for the joint photographic experts group (JPEG) format and/or other image formats, optical flow accelerator (OFA) instructions, and/or the like. With the disclosed techniques, a user mode driver executing on a CPU submits new work to the GPU without having to rely on the intervention of secure microcode executing on a secure processor included in the GPU. Instead, with the disclosed techniques, the new work submitted by the user mode driver is copied and decrypted by one or more copy engines, a more plentiful GPU resource than the secure processor.

The copy engines have the capability to read encrypted data from unsecure system memory, decrypt and authenticate the encrypted data, and then write the decrypted data into the compute protected region of memory. Via a two-level pushbuffer structure, a copy engine channel is activated to perform these copy operations for a CPU that lacks the ability to directly submit new instructions to the channel.

Each user mode driver executing on the CPU is assigned a separate and dedicated work launch copy engine channel, also referred to herein as a "work launch channel." The pushbuffer data structures of the work launch channel reside in the compute protected region of memory. The work launch channel is initialized by secure microcode executing on the secure processor when the user mode driver is initialized. The pushbuffer entries for the work launch channel are predetermined and do not change after initialization by the secure processor.

The work launch channel includes a pair of pushbuffer entries. The first pushbuffer entry points to a predetermined pushbuffer segment that resides in the compute protected region of memory. When executed by the launch copy engine, the methods in this pushbuffer segment perform a decrypted copy of a fixed sized buffer from a specific address in system memory into a predefined target buffer located in the compute protected region of memory. The second pushbuffer entry points to this target buffer in the compute protected region of memory as the source of the next pushbuffer segment. As a result, whatever data is copied into the compute protected region of memory by the copy operation triggered by the first pushbuffer segment becomes the contents of the second pushbuffer segment and subsequently is executed as methods of the channel.

To launch work within the PPU 202, the user mode driver executing on the CPU generates new pushbuffer segments for different target engines. The user mode driver encrypts and stores the new pushbuffer segments in system memory. The user mode driver generates a sequence of copy engine methods to perform the copy operations to move the newly submitted pushbuffer segments to respective target locations in the compute protected region of memory. The user mode driver encrypts and stores the sequence of copy engine methods. In some examples, the encrypted pushbuffer segments are signed in order to support authentication of the pushbuffer segments, thereby reducing or eliminating corruption of the methods included in the pushbuffer segments. The user mode driver stores the encrypted copy engine methods in the predefined system memory location that is the source buffer of the corresponding work launch channel copy instructions stored in the first pushbuffer segment. In addition, the user mode driver encodes methods in the buffer to update the put pointer for the work launch channel, thereby identifying the end of the second pushbuffer segment. Once the source buffer is populated, the user mode driver notifies the scheduler of the pending work in the work launch channel.

Upon receiving notification of pending work in the work launch channel, the scheduler marks the work launch channel as PENDING and subsequently schedules the channel. After the channel is loaded, methods from the first pushbuffer segment are executed by the copy engine. These methods cause the copy engine to copy the encrypted source buffer with copy engine instructions into the compute protected region of memory. Because the target location of this copy operation is the pushbuffer segment pointed to by the second pushbuffer entry of the work launch channel, the scheduler fetches the copied data as methods of the work launch channel and forwards the methods to the copy engine for execution. These methods have instructions for the copy engine to copy all newly submitted pushbuffer data structures for other channels executing on different compute engines and/or other engines for the user mode software application. The methods further include instructions for the copy engine and/or scheduler to notify the channels for which new work has been submitted. Further, the methods include instructions to update the put pointer for the work launch channel. When these instructions are executed, the put pointer for the work launch channel is incremented such that the work launch channel is again ready to repeat the same steps described above upon receiving a subsequent notification. Thus, by repeatedly copying encrypted instructions in the source buffer from system memory to the compute protected region of memory, and then sending a notification to scheduler for the work launch channel, the user mode driver can launch work to any copy engine channel assigned to the user mode driver. Further, other than the initial setup of the work launch channel, the secure processors do not take part in the work launch process.

At least one technical advantage of the disclosed techniques relative to the prior art is that, with the disclosed techniques, the secure processors are not directly involved in launching work, other than initializing the work launch channels. Instead, work launch is performed by copy engines, a more plentiful resource than the secure processors. In general, copy engines are designed to saturate the interface bandwidth while decrypting and authenticating data. Unlike the secure processors, copy engines are specifically designed to perform fast secure data movement. As a result, new work is launched with reduced latency and increased performance relative to prior approaches. An additional advantage of the disclosed techniques is that the copy engines copy encrypted data from unsecure system memory, decrypt the data, authenticate the data, and store the decrypted data in secure memory. Consequently, the copy engines are able to launch new work in secure mode without compromising security. These advantages represent one or more technological improvements over prior art approaches.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for launching secure tasks on a processing unit, the method comprising:

receiving a notification indicating that an encrypted copy task is stored in the unsecure memory;

subsequent to receiving the notification, executing a method that is stored in a protected region of memory, wherein executing the method causes the processing unit to read encrypted copy task from a given location in an unsecure memory;

decrypting the encrypted copy task to generate a decrypted copy task;

executing the decrypted copy task that causes an encrypted secure task to be copied from the unsecure memory to the protected region of memory;

decrypting the encrypted secure task to generate a decrypted secure task; and scheduling the decrypted secure task for execution.

2. The computer-implemented method of claim 1, wherein at least one of the decrypted copy task or the decrypted secure task is executed in a secure mode.

3. The computer-implemented method of claim 1, further comprising:

performing an authentication on the decrypted copy task; and determining that the authentication is successful prior to executing the decrypted copy task.

4. The computer-implemented method of claim 1, further comprising:

performing an authentication on the decrypted secure task; and determining that the authentication is successful prior to scheduling the decrypted secure task for execution.

5. The computer-implemented method of claim 1, wherein reading the encrypted copy task from the unsecure memory comprises:

accessing a first pushbuffer entry that includes a first pointer;

accessing a first method stored in a memory location in the protected region of memory and associated with the first pointer; and executing the first method to copy a first memory buffer that includes the encrypted copy task to a second memory buffer.

6. The computer-implemented method of claim 5, wherein the first memory buffer resides at a first fixed location in the unsecure memory and the second memory buffer resides at a second fixed location in the protected region of memory.

7. The computer-implemented method of claim 5, wherein executing the decrypted copy task comprises:

accessing a second pushbuffer entry that includes a second pointer associated with the second memory buffer;

accessing a second copy task stored in a memory location in the protected region of memory and associated with the second memory buffer; and executing the second copy task to copy a third memory buffer that includes the encrypted secure task to a fourth memory buffer.

8. The computer-implemented method of claim 7, wherein the third memory buffer resides at a first fixed location in the unsecure memory and the fourth memory buffer resides at a second fixed location in the protected region of memory.

9. The computer-implemented method of claim 1, further comprising, prior to scheduling the decrypted secure task for execution, receiving a notification indicating that the decrypted secure task is stored in the protected region of memory.

10. The computer-implemented method of claim 1, further comprising:

reading a second encrypted copy task from the unsecure memory;

decrypting the second encrypted copy task to generate a second decrypted copy task;

performing an authentication on the second decrypted copy task;

determining that the authentication has failed; and blocking the second decrypted copy task from executing.

11. The computer-implemented method of claim 1, further comprising:

blocking execution of the decrypted copy task pending a notification of a second encrypted secure task;

receiving the notification of the second encrypted secure task;

executing the decrypted copy task that causes the second encrypted secure task to be copied from the unsecure memory to the protected region of memory;

decrypting the second encrypted secure task to generate a second decrypted secure task; and scheduling the second decrypted secure task for execution.

12. One or more non-transitory computer-readable media storing program instructions that, when executed by one or more processors, cause the one or more processors to perform steps of:

receiving a notification indicating that an encrypted copy task is stored in the unsecure memory;

subsequent to receiving the notification, executing a method that is stored in a protected region of memory, wherein executing the method causes the processing unit to read encrypted copy task from a given location in an unsecure memory;

decrypting the encrypted copy task to generate a decrypted copy task;

executing the decrypted copy task that causes an encrypted secure task to be copied from the unsecure memory to the protected region of memory;

decrypting the encrypted secure task to generate a decrypted secure task; and scheduling the decrypted secure task for execution.

13. The one or more non-transitory computer-readable media of claim 12, further comprising:

performing an authentication on the decrypted copy task; and determining that the authentication is successful prior to executing the decrypted copy task.

14. The one or more non-transitory computer-readable media of claim 12, further comprising:

performing an authentication on the decrypted secure task; and determining that the authentication is successful prior to scheduling the decrypted secure task for execution.

15. The one or more non-transitory computer-readable media of claim 12, wherein reading the encrypted copy task from the unsecure memory comprises:

accessing a first pushbuffer entry that includes a first pointer;

accessing a first method stored in a memory location in the protected region of memory and associated with the first pointer; and executing the first method to copy a first memory buffer that includes the encrypted copy task to a second memory buffer.

16. The one or more non-transitory computer-readable media of claim 15, wherein the first memory buffer resides at a first fixed location in the unsecure memory and the second memory buffer resides at a second fixed location in the protected region of memory.

17. The one or more non-transitory computer-readable media of claim 15, wherein executing the decrypted copy task comprises:

accessing a second pushbuffer entry that includes a second pointer associated with the second memory buffer;

accessing a second copy task stored in a memory location in the protected region of memory and associated with the second memory buffer; and executing the second copy task to copy a third memory buffer that includes the encrypted secure task to a fourth memory buffer.

18. The one or more non-transitory computer-readable media of claim 17, wherein the third memory buffer resides at a first fixed location in the unsecure memory and the fourth memory buffer resides at a second fixed location in the protected region of memory.

19. A system, comprising:

a memory storing instructions; and a processor that is coupled to the memory and, when executing the instructions:

receive a notification indicating that an encrypted copy task is stored in the unsecure memory;

subsequent to receiving the notification, execute a method that is stored in a protected region of memory, wherein executing the method causes the processing unit to read encrypted copy task from a given location in an unsecure memory;

decrypts the encrypted copy task to generate a decrypted copy task;

executes the decrypted copy task that causes an encrypted secure task to be copied from the unsecure memory to the protected region of memory;

decrypts the encrypted secure task to generate a decrypted secure task and schedules the decrypted secure task for execution.

* * * * *